(12) United States Patent
Algie et al.

(10) Patent No.: US 10,146,622 B2
(45) Date of Patent: Dec. 4, 2018

(54) COMBINING DEDUPLICATION WITH LOCALITY FOR EFFICIENT AND FAST STORAGE

(71) Applicant: International Business Machines Corporation, Armonk, NY (US)

(72) Inventors: Teague S. Algie, Chicago, IL (US); Praveen Viraraghavan, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/836,805

(22) Filed: Dec. 8, 2017

(65) Prior Publication Data
US 2018/0101432 A1    Apr. 12, 2018

Related U.S. Application Data

(63) Continuation-in-part of application No. 15/399,579, filed on Jan. 5, 2017, now Pat. No. 9,910,732, which
(Continued)

(51) Int. Cl.
*G06F 11/00* (2006.01)
*G06F 11/10* (2006.01)
(Continued)

(52) U.S. Cl.
CPC .......... *G06F 11/1076* (2013.01); *G06F 3/064* (2013.01); *G06F 3/067* (2013.01);
(Continued)

(58) Field of Classification Search
CPC .... G06F 11/1076; G06F 3/0619; G06F 3/064; G06F 11/1092; H04L 67/1097
See application file for complete search history.

(56) References Cited

U.S. PATENT DOCUMENTS 4,092,732 A   5/1978 Ouchi
5,454,101 A   9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Esaw T Abraham
(74) *Attorney, Agent, or Firm* — Garlick & Markison; Timothy W. Markison; Tim D. Taylor

(57) ABSTRACT

A method begins by receiving a storage request to store one or more portions of a data object. The method continues by determining whether the one or more portions are stored within a dispersed storage network memory. When stored, the method continues by determining a retrieval demand for each portion. When the retrieval demand for a first portion is below a first threshold, the method continues by indicating that an existing copy of the first portion will be used for retrieval requests of the first portion. When the retrieval demand is above the first threshold, the method continues by copying the existing copy to create a first portion copy and indicating that the existing copy will be used for retrieval requests from a first group of user computing devices and indicating that the first portion copy will be used for retrieval requests from a second group of user computing devices.

14 Claims, 8 Drawing Sheets

Related U.S. Application Data is a continuation of application No. 14/805,637, filed on Jul. 22, 2015, now Pat. No. 9,591,076.

(60) Provisional application No. 62/047,458, filed on Sep. 8, 2014.

(51) Int. Cl.
*G06F 3/06* (2006.01)
*H04L 29/08* (2006.01)

(52) U.S. Cl.
CPC ........ *G06F 3/0619* (2013.01); *G06F 11/1092* (2013.01); *H04L 67/1097* (2013.01); *G06F 2211/1028* (2013.01)

(56) References Cited

U.S. PATENT DOCUMENTS

| | | | |
|---|---|---|---|
| 5,485,474 A | 1/1996 | Rabin | |
| 5,544,322 A * | 8/1996 | Cheng | H04L 63/0807 340/5.8 |
| 5,758,068 A * | 5/1998 | Brandt | G06F 21/10 705/59 |
| 5,774,643 A | 6/1998 | Lubbers et al. | |
| 5,802,364 A | 9/1998 | Senator et al. | |
| 5,809,285 A | 9/1998 | Hilland | |
| 5,815,574 A * | 9/1998 | Fortinsky | G06F 21/6218 713/153 |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 * | 8/2004 | Buckland | G06F 11/2058 711/153 |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 * | 11/2004 | Ma | G06F 21/64 380/286 |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 * | 7/2006 | Kitamura | G06F 11/1092 714/6.21 |
| 2006/0224603 A1 | 10/2006 | Correll | |
| 2006/0269148 A1 * | 11/2006 | Farber | G06Q 40/00 382/232 |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0180296 A1 | 8/2007 | Byrne et al. | |
| 2007/0214285 A1 * | 9/2007 | Au | G06F 11/1076 709/246 |
| 2007/0234110 A1 | 10/2007 | Soran et al. | |
| 2007/0283167 A1 | 12/2007 | Venters et al. | |
| 2008/0043750 A1 * | 2/2008 | Keels | H04L 49/9094 370/395.52 |
| 2008/0273693 A1 * | 11/2008 | Au | H03M 7/40 380/28 |
| 2008/0282128 A1 | 11/2008 | Lee et al. | |
| 2009/0094251 A1 | 4/2009 | Gladwin et al. | |
| 2009/0094318 A1 | 4/2009 | Gladwin et al. | |
| 2009/0254572 A1 * | 10/2009 | Redlich | G06Q 10/06 |
| 2010/0023524 A1 | 1/2010 | Gladwin et al. | |
| 2010/0306621 A1 | 12/2010 | Cassidy | |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

(56) References Cited

OTHER PUBLICATIONS

Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner

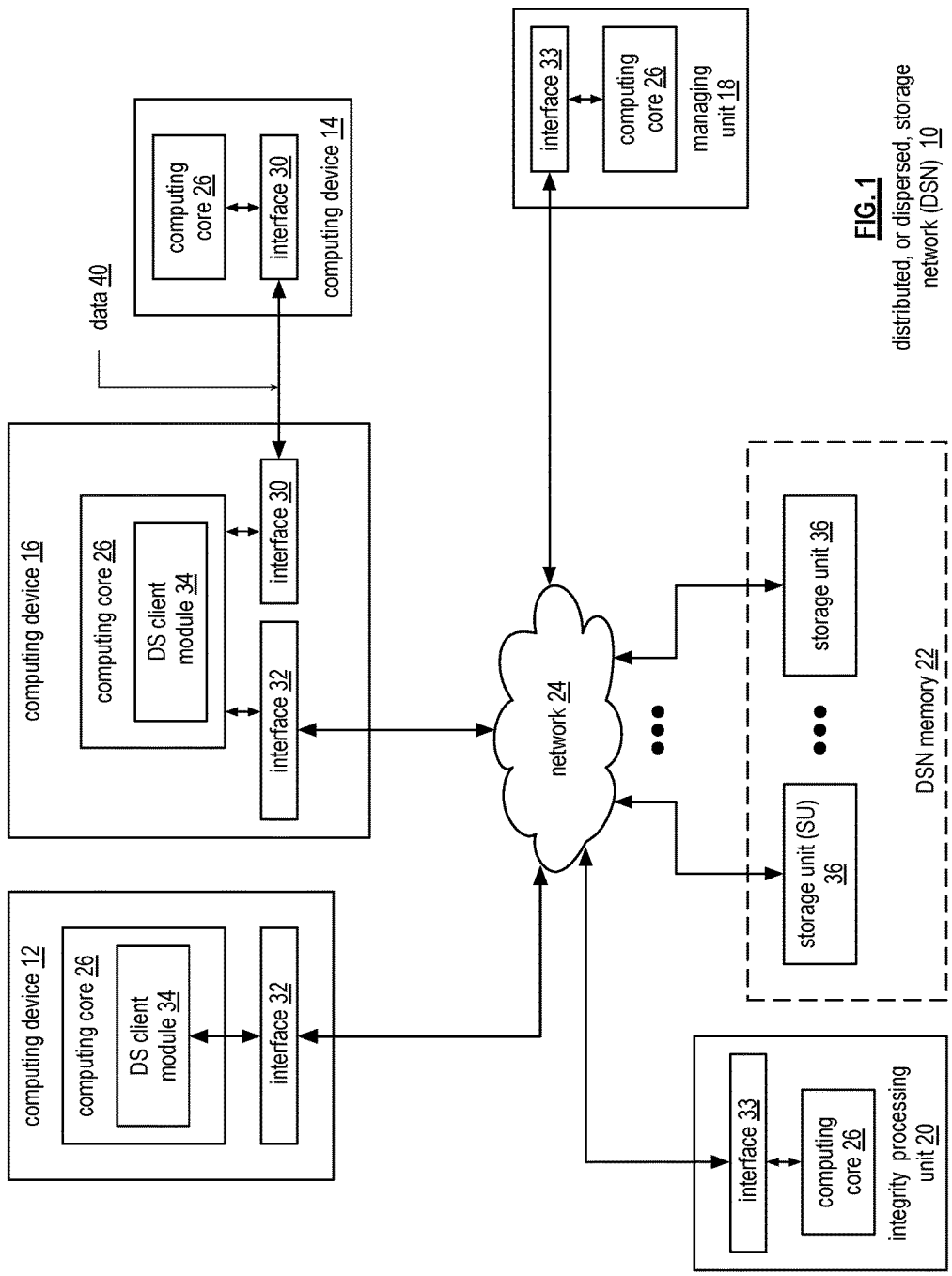

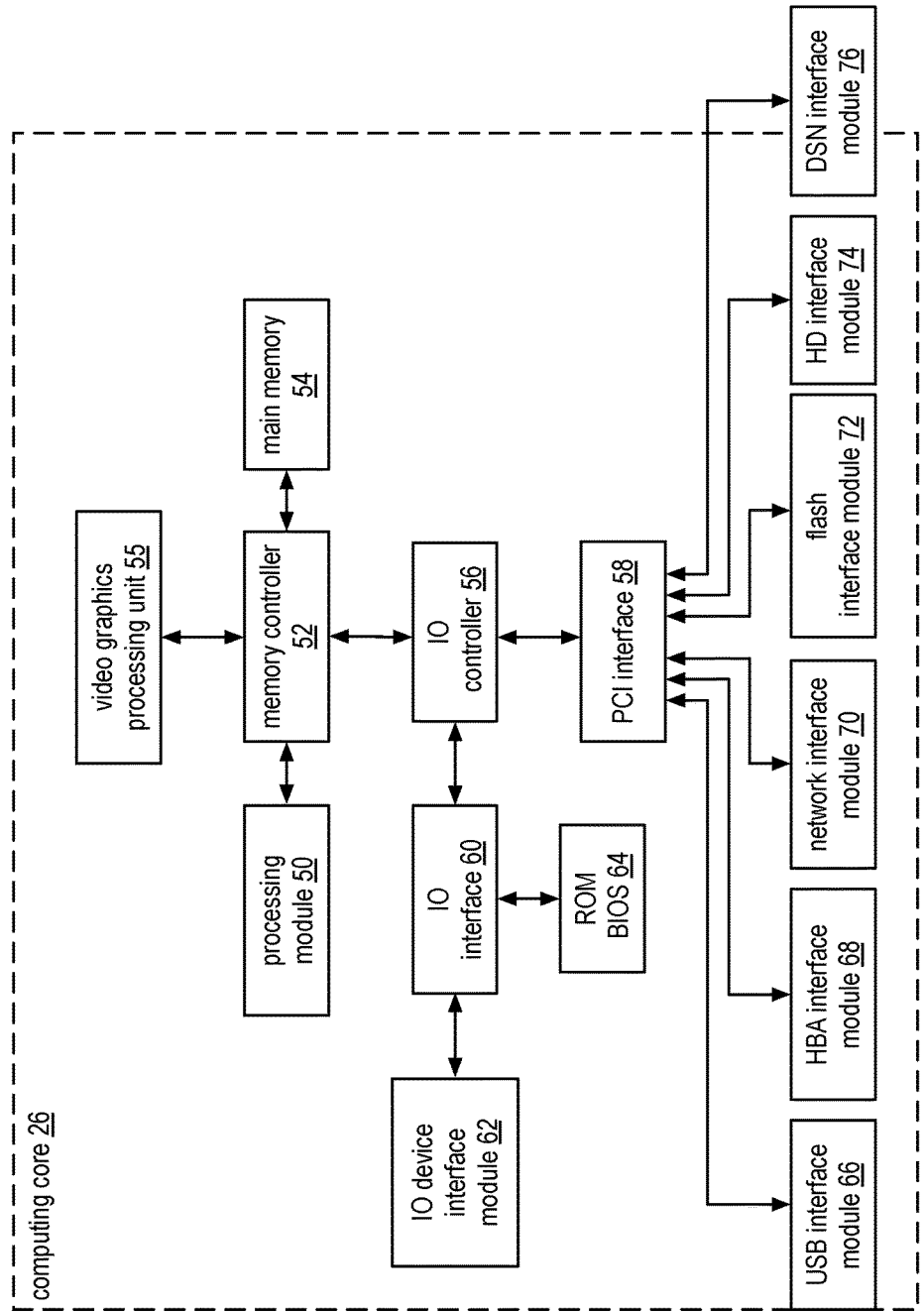

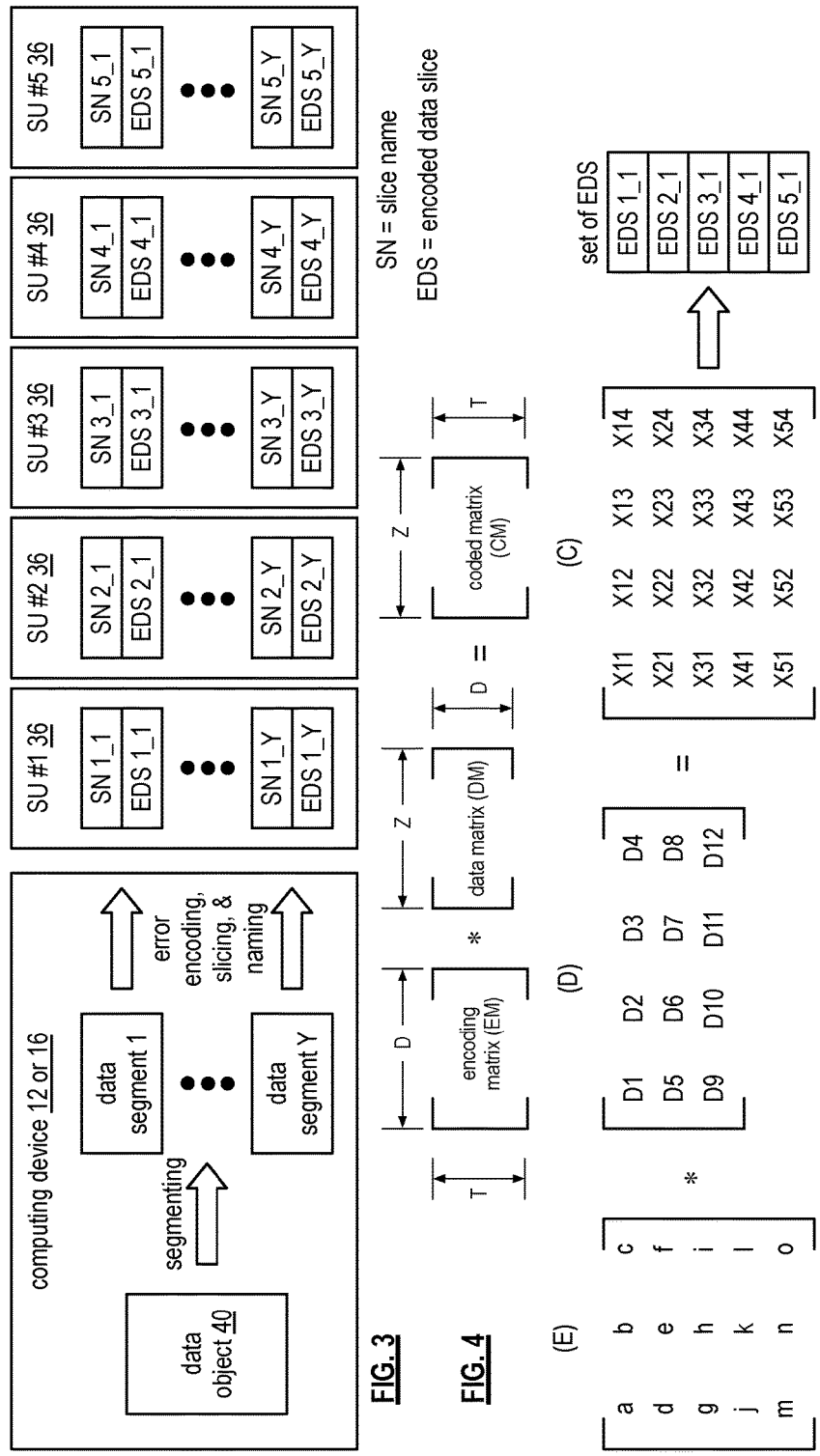

COMBINING DEDUPLICATION WITH LOCALITY FOR EFFICIENT AND FAST STORAGE

CROSS-REFERENCE TO RELATED APPLICATIONS

The present U.S. Utility Patent Application claims priority pursuant to 35 U.S.C. § 120 as a continuation-in-part of U.S. Utility application Ser. No. 15/399,579, entitled "MAINTAINING A DESIRED NUMBER OF STORAGE UNITS", filed Jan. 5, 2017, now issued as U.S. Pat. No. 9,910,732 on Mar. 6, 2018, which is a continuation of U.S. Utility application Ser. No. 14/805,637, entitled "MAINTAINING A DESIRED NUMBER OF STORAGE UNITS", filed Jul. 22, 2015, now issued as U.S. Pat. No. 9,591,076 on Mar. 7, 2017, which claims priority pursuant to 35 U.S.C. § 119(e) to U.S. Provisional Application No. 62/047,458, entitled "SELECTING RESOURCES IN A DISPERSED STORAGE NETWORK", filed Sep. 8, 2014, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 1 is a schematic block diagram of an embodiment of a dispersed or distributed storage network (DSN) in accordance with the present invention;

FIG. 2 is a schematic block diagram of an embodiment of a computing core in accordance with the present invention;

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 7:
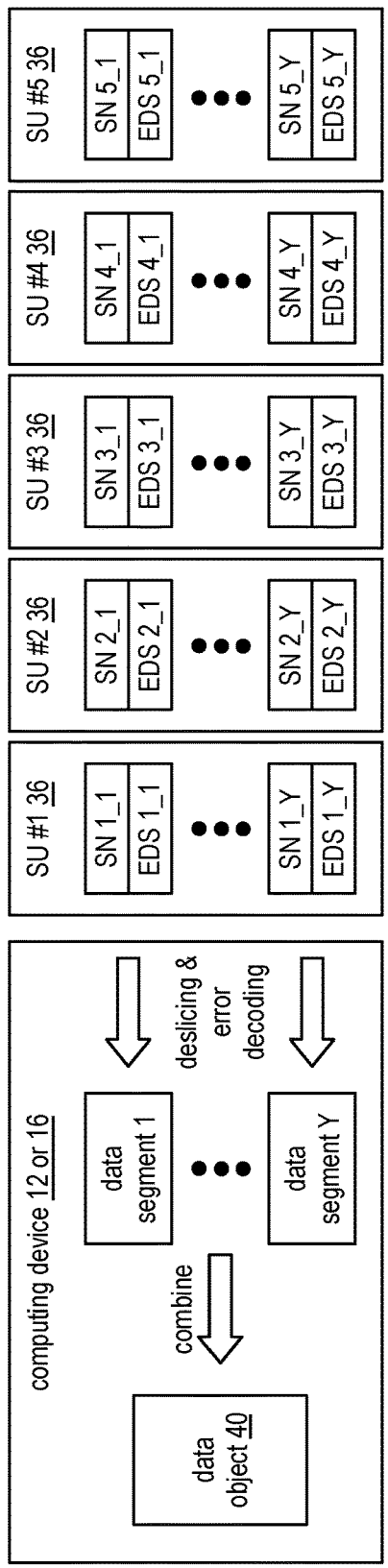
FIG. 7 is a schematic block diagram of an example of dispersed storage error decoding of data in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data (e.g., data 40) on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity check-sum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
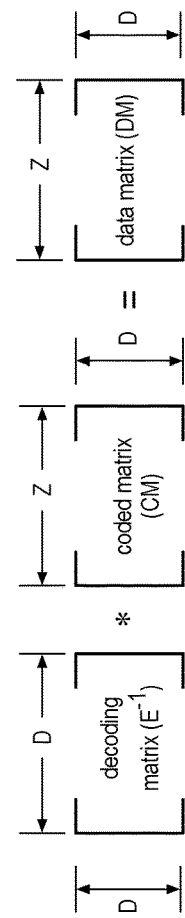
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
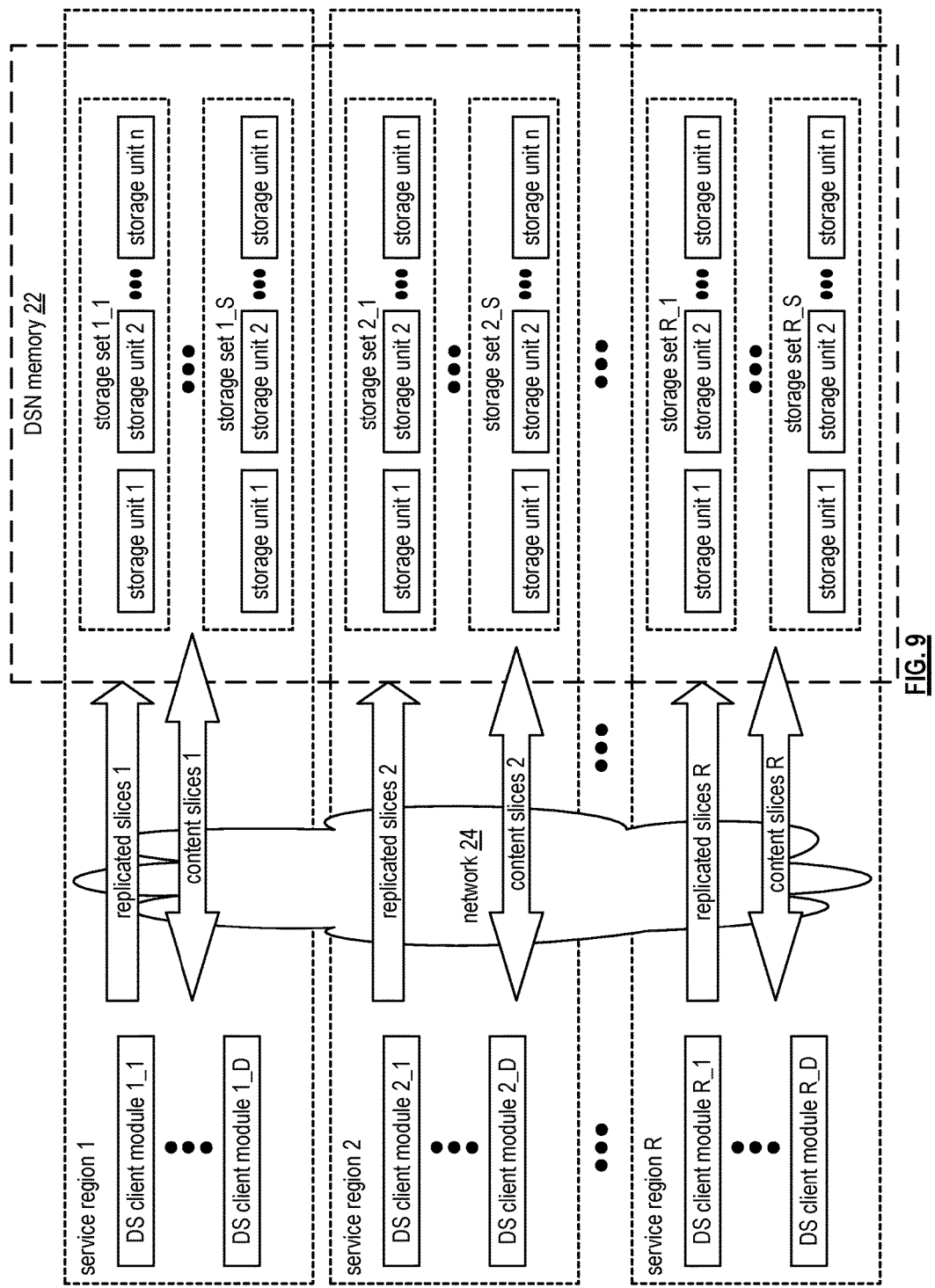
FIG. 9 is a schematic block diagram of an embodiment of a dispersed storage network in accordance with the present invention.

FIG. 9 is a schematic block diagram of an embodiment of a dispersed storage network (DSN) that includes the dispersed storage network (DSN) memory 22 of FIG. 1, the network 24 of FIG. 1, and a plurality of service regions 1-R. The DSN memory 22 includes a multitude of storage sets, where one or more storage sets 1-S are associated with each service region 1-R. Each storage set includes a set of storage units 1-n. Each service region further includes one or more DS client modules 1-D. Each DS client module may be implemented utilizing the DS client module 34 of FIG. 1. Each storage unit may be implemented utilizing the storage unit 36 of FIG. 1.

The DSN functions to access data stored in the DSN memory 22. The accessing includes storing the data as stored data (e.g., replicated slices, content slices, etc.) and retrieving the stored data (e.g., content slices). In an example of operation of the storing of the data, the DS client module 1_1 receives a data object for storage in the DSN memory 22, where a data identifier (ID) is associated with the data object. The DS client module 1_1 determines whether a stored data object substantially matches the data object (e.g., already stored). The determining may be based on one or more of matching the data object to the stored data object, matching the data ID to a data ID of the stored data object, and matching a representation of the data object with a representation of the stored data object (e.g., matching hashes). When the stored data object substantially matches the data object, the DS client module may determine a retrieval demand for one or more portions of the data object and is discussed in further detail with reference to FIG. 11.

When the stored data object does not substantially match the data object, the DS client module 1_1 dispersed storage error encodes the data object to produce a plurality of sets of encoded data slices. Having produced the slices, the DS client module 1_1 selects one or more service regions for storage of the plurality of sets of encoded data slices. The selecting may be based on one or more of a predetermination (e.g., all selecting a local service region), a data object size, an estimated frequency of retrieval, and an expected distribution of retrieving entities by service region. As a specific example, the DS client module 1_1 selects service regions 1-R when the data object is expected to be retrieved frequently from all service regions. As another specific example, the DS client module 1_1 selects service regions 1 and 2 when the data is always to be stored in the local service region and retrieving entities are expected within service region 2.

Having selected the service regions, the DS client module 1_1, for each selected service region, identifies one storage set associated with the service region. The identifying may be based on one or more of an available storage capacity level, an estimated performance level, a required performance level, and proximity to the retrieving entities. As a specific example, the DS client module 1_1 selects storage set 1_2 of the service region 1 when the storage set 1_2 has a greatest level of available storage capacity within service region 1.

For each identified storage set of each selected service region, the DS client module 1_1 facilitates storage of the plurality of sets of encoded data slices. For example, the DS client module 1_1 sends, via the network 24, the plurality of sets of encoded data slices to the DS execution units of each storage set. Having facilitated the storage of the plurality of sets of encoded data slices, the DS client module 1_1 associates each identified storage set with the data ID. For example, the DS client module 1_1 updates at least one of a DSN directory and a dispersed hierarchical index to associate the data ID with the identified storage set of each selected service region.

In an example of operation of the retrieving of the stored data, the DS client module 2_2 receives a data object retrieval request, where the request includes the data ID of the stored data object. Having received the request, the DS client module 2_2 identifies an association of the data ID with one or more of the service regions. For example, the DS client module 2_2 accesses at least one of the DSN directory and the dispersed hierarchical index to recover the association and identify the one or more service regions.

Having identified the one or more service regions, the DS client module 2_2 selects a service region of the associated service regions. The selecting may be based on one or more of an estimated performance level, a required performance level, proximity, a random selection, and a previous selection. The selecting may further include selecting another service region as a second choice. For instance, the DS client module 2_2 selects service region 2 and selects service region 1 as a second choice when service region 2 provides optimal proximity and service region 1 provides second-best proximity.

Having selected the service region, the DS client module 2_2 identifies one storage set associated with the data ID. For example, the DS client module 2_2 accesses the at least one of the DSN directory and the dispersed hierarchical index to identify the one storage set. For instance, the DS client module 2_2 identifies storage set 2_4 of the service region 2 based on a DSN directory lookup and identifies storage set 1_1 of the service region 1 based on the DSN directory lookup.

Having identified the storage set, the DS client module 2_2 facilitates recovery of at least a decode threshold number of encoded data slices of each set of encoded data slices of the plurality of sets of encoded data slices from one or more of the identified storage set and a second choice storage set of another service region. For example, the DS client module 2_2 issues, via the network 24, read slice requests to a read threshold number of storage units of the storage set 2_4 of the service region 2 and to at least some storage units of the storage set 1_1 of the service region 1. The DS client module 2_2 receives, via the network 24, encoded data slices. Alternatively, the DS client module 2_2 issues some of the read slice requests to the service region of the second choice when not receiving the at least a decode threshold number of encoded data slices for each set of encoded data slices.

For each set of encoded data slices, the DS client module 2_2 dispersed storage error decodes the received decode threshold number of encoded data slices to produce a recovered data segment of a plurality of recovered data segments to reproduce the data object. As a specific example, the DS client module 2_2 aggregates recovered data segments to reproduce the stored data object.

Figure 10:
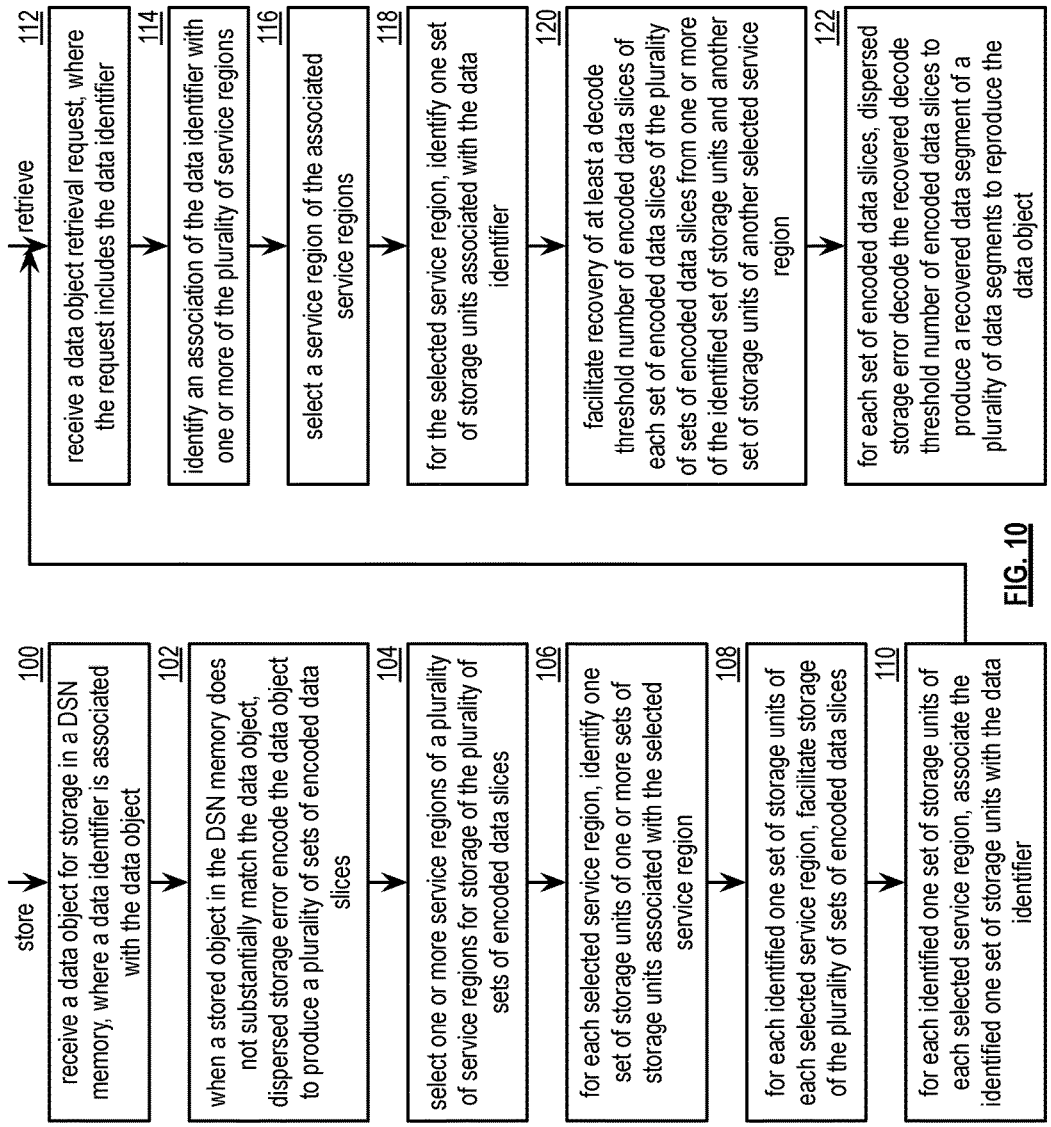
FIG. 10 is a flowchart illustrating an example of accessing data in accordance with the present invention.

FIG. 10 is a flowchart illustrating an example of accessing data. The method begins or continues at step 100 where a processing module (e.g., of a computing device), when storing data, receives a data object for storage in a dispersed storage network (DSN) memory, where a data identifier (ID) is associated with the data object. When a stored data object in the DSN memory does not substantially match the data object, the method continues at step 102 where the processing module dispersed storage error encodes the data object to produce a plurality of sets of encoded data slices.

The processing module determines whether the data object has already been stored in the DSN memory by one or more of matching the data object to the stored data object, matching the identifier to an identifier of the stored data object, and matching a representation of the data object to a representation of the stored data object. The representations include a value generated by applying a deterministic function to the data object and the stored data object. The deterministic function may include at least one of a hashing function, a hash-based message authentication code function, a mask generating function, and a sponge function.

The method continues at step 104 where the processing module selects one or more service regions of a plurality of service regions for storage of the plurality of sets of encoded data slices. The selecting may be based on one or more of a predetermination, a data object size, an estimated frequency of data object retrieval, and an expected distribution of retrieving entities by service region. For each selected service region, the method continues at step 106 where the processing module identifies one set of storage units of one or more sets of storage units associated with the selected service region. The identifying may be based on one or more of an available storage capacity level, an estimated performance level, a required performance level, and proximity to the receiving entities.

For each identified one set of storage units of each selected service region, the method continues at step 108 where the processing module facilitates storage of the plurality of sets of encoded data slices. For example, the processing module sends the plurality of sets of encoded data slices to the identified set of storage units. For each identified one set of storage units of each selected service region, the method continues at step 110 where the processing module associates the identified one set of storage units with the data identifier. The associating includes updating at least one of a DSN directory and a dispersed hierarchical index to associate the data ID with the identified set of storage units of each selected region.

The method begins or continues, when retrieving stored data, at step 112 where the processing module receives a data object retrieval request, where the request includes the data identifier (ID). The method continues at step 114 where the processing module identifies an association of the data identifier with one or more of the plurality of service regions. The identifying includes accessing at least one of the DSN directory and the dispersed hierarchical index to recover the association.

The method continues at step 116 where the processing module selects a service region of the associated service regions. The selecting may be based on one or more of an estimated performance level, a required performance level, and proximity. The selecting may further include selecting a second choice service region.

For the selected service region, the method continues at step 118 where the processing module identifies one set of storage units associated with the data identifier. The identifying includes at least one of accessing the DSN directory and accessing the dispersed hierarchical index to identify the set of storage units. The identifying may further include initiating a query to one or more storage units and interpreting a query response that identifies the one set of storage units.

The method continues at step 120 where the processing module facilitates recovery of at least a decode threshold number of encoded data slices of each set of encoded data slices of the plurality of sets of encoded data slices from one or more of the identified set of storage units and another set of storage units of another selective service region when the second choice service region has been selected. The facilitating includes one or more of issuing read slice requests to a read threshold number of the identified set of storage units, receiving encoded data slices, selecting the other set of storage units (e.g., based on next best performance) and issuing further requests to the other set of storage units when a decode threshold number of encoded data slices has not been received for a particular set of encoded data slices.

For each set of encoded data slices, the method continues at step 122 where the processing module dispersed storage error decodes the recovered decode threshold number of encoded data slices to produce a recovered data segment of a plurality of data segments to reproduce the data object. For example, the processing module reproduces each data segment and aggregates the plurality of data segments to reproduce the data object.

Figure 11:
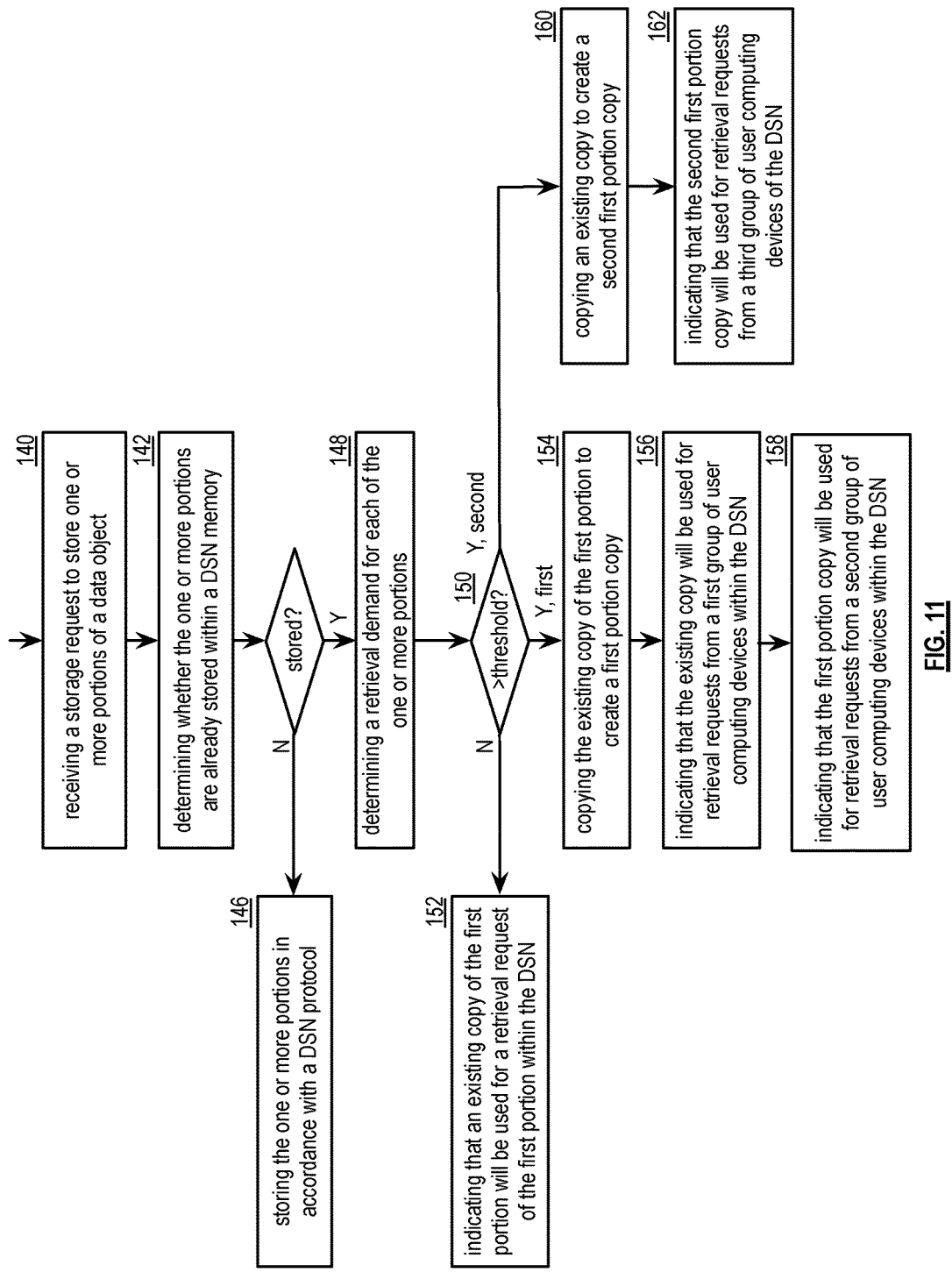
FIG. 11 is a flowchart illustrating of an example of storing one or more portions of a data object in accordance with the present invention.

FIG. 11 is a flowchart illustrating an example of storing one or more portions of a data object in a dispersed storage network (DSN). The method begins with step 140, where a computing device (e.g., a computing device 12-16, a managing unit 18, an integrity processing unit 20, and a storage unit 36 of FIG. 1) of the DSN receives a storage request to store one or more portions of a data object. The data object includes a plurality of portions and a portion of the plurality of portions includes one or more data segments. The data object may be divided (e.g., by the computing device, prior to the receiving the storage request by another computing device, etc.) into a plurality of data segments, which are dispersed storage error encoded into pluralities of sets of encoded data slices. In one example, a set of the pluralities of sets of encoded data slices corresponds to a portion of the data object. In another example, two sets of encoded data slices of the pluralities of sets of encoded data slices correspond to the portion of the data object.

The method continues with step 142, where the computing device determines whether the one or more portions are already stored within a DSN memory. For example, the computing device may compare a data ID for the one or more portions included in the retrieval request to stored data IDs in the DSN memory (e.g., a service region 1-R of FIG. 9), and when the data ID substantially matches a stored data ID, may indicate the one or portions are already stored in the DSN memory. When the one or more portions are not already stored in the DSN memory, the method continues with step 146, where the computing device stores the one or more portions in accordance with a DSN protocol. For example, the protocol may indicate to perform one or more steps of FIG. 10 beginning with step 102. As another example, the protocol may indicate to determine an anticipated retrieval demand, and to store the one or more portions in DSN memory in accordance with the anticipated retrieval demand (e.g., by creating a number of replicas of each portion based on the amount of anticipated retrieval demand).

When the one or more portions are already stored in the DSN memory, the method continues with step 148, where the computing device determines a retrieval demand for each of the one or more portions. For example, the computing device may determine the retrieval demand based on an anticipated retrieval demand level (e.g., number of users who have a television series program set to record, etc.). As another example, the computing device may determine the retrieval demand based on a historical retrieval demand level based on related content (e.g., number of viewers of a previous episode of a television series, etc.). As still yet another example, the computing device may determine the retrieval demand based on an indicator from a content provider and/or an indicator from a system operator. In one embodiment, the retrieval demand is determined on a service region by service region basis. In one embodiment, the retrieval demand is determined for a number of storage units within a certain proximity (e.g., 1 mile).

The method continues with step 150, where the computing device determines whether the retrieval demand is greater than one or more thresholds. When a retrieval demand for a first portion of the one or more portions is not greater than a first threshold, the method continues with step 152, where the computing device indicates that an existing copy of the first portion will be used for retrieval requests of the first portion within the DSN (e.g., service regions 1-R).

When the retrieval demand for the first portion of the one or more portions is greater than the first threshold, the method continues with step 154, where the computing device copies the existing copy of the first portion to create a first portion copy. The method continues with step 156, where the computing device indicates that the existing copy of the first portion will be used for retrieval requests from a first group of user computing devices of the DSN (e.g., within a first service region). The method continues with step 158, where the computing device indicates that the first portion copy will be used for retrieval requests from a second group of user computing devices within the DSN (e.g., within a second service region).

When the retrieval demand for the first portion of the one or more portions is greater than a second threshold, the method branches to step 160, where the computing device copies an existing first portion (e.g., the existing copy of the first portion, the first portion copy, etc.) to create a second first portion copy. Note that the second threshold is greater than the first threshold. For example, the first threshold may be 5 user computing devices having a demand for one or more portions of the data object and a second threshold may be 10 user computing devices having a demand for the one or more portions. As another example, the first threshold may be 50 user computing devices having a demand for one or more portions of the data object and a second threshold may be 75 user computing devices having a demand for the one or more portions.

The method continues to step 162, where the computing device indicates that the second first portion copy will be used for retrieval requests from a third group of user computing devices of the DSN (e.g., within a third service region).

Figure 12:
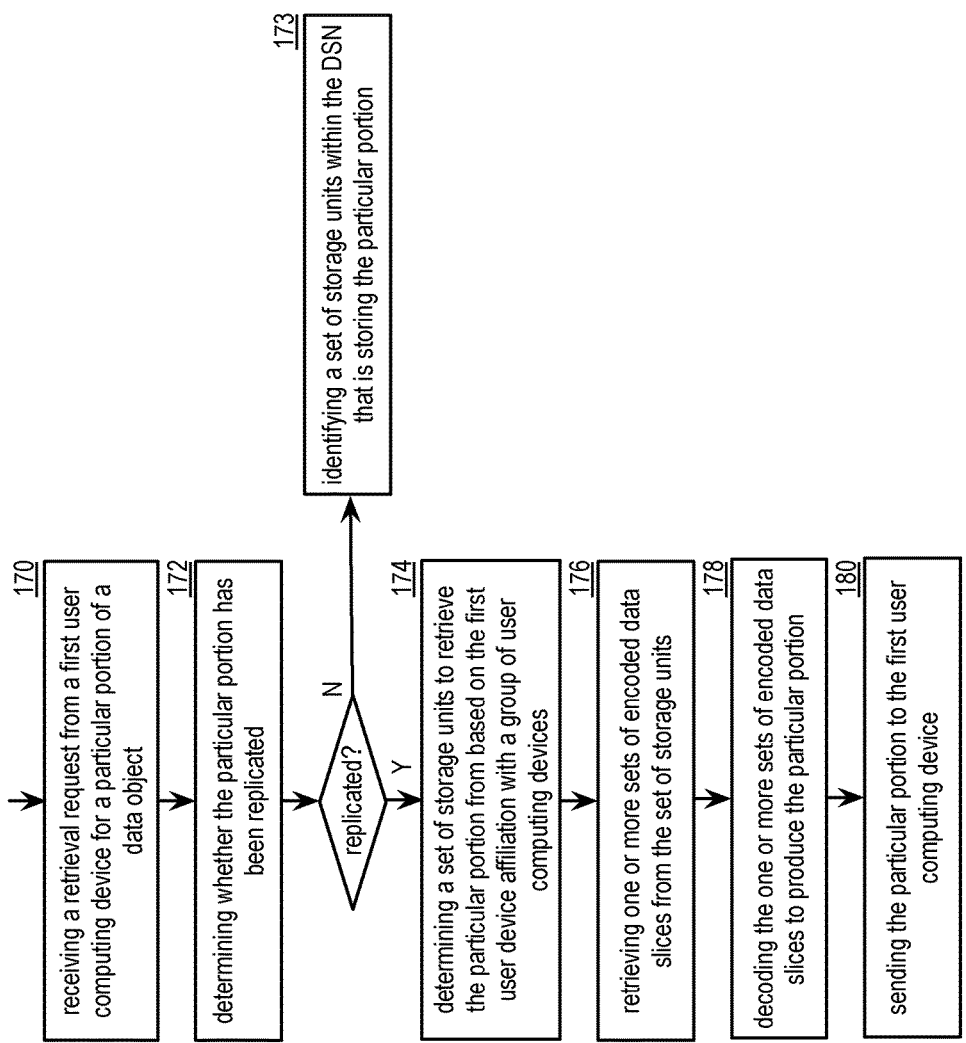
FIG. 12 is a flowchart illustrating of an example of retrieving a particular portion of a data object in accordance with the present invention.

FIG. 12 is a flowchart illustrating an example of retrieving a particular portion of a data object in a dispersed storage network (DSN). The method begins with step 170, where a computing device (e.g., a computing device 12-16 of FIG. 1, etc.) receives, from a first user computing device, a retrieval request for a particular portion of the data object. For example, the request may be for a portion (e.g., particular scene) of a movie. As another example, the request may be for a chapter of a book. In one embodiment, the particular portion is the data object.

The method continues to step 172, where the computing device determines whether the particular portion has been replicated. For example, the computing device may compare a hash of the particular portion received with the retrieval request to stored hashes of the DSN memory. When the particular portion has not been replicated, the method continues to step 173, where the computing device identifies a set of storage units within the DSN that is storing the particular portion.

When the particular portion has been replicated, the method continues to step 174, where the computing device determines a set of storage units to retrieve the particular portion from based on the first user computing device affiliation with a group of user computing devices. For example, the computing device determines to retrieve the particular portion from a set of storage units that has a first level proximity (e.g., same local area network, within ¼ mile, etc.) to the first user computing device. Note a group of user computing devices may be associated with a set of storage units (e.g., storage set R_1), a service region (e.g., service region 2), or a plurality of service regions (e.g., service regions 1-3).

The method continues to step 176, where the computing device retrieves one or more sets of encoded data slices from the set of storage units. The method continues to step 178, where the computing device decodes the one or more sets of encoded data slices to produce the particular portion. The method continues to step 180, where the computing device sends the particular portion to the first user computing device.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   receiving, by a computing device of a dispersed storage network (DSN), a storage request to store one or more portions of a data object, wherein the data object includes a plurality of portions;
   determining, by the computing device, whether the one or more portions are already stored within a DSN memory;
   when the one or more portions are stored:

determining, by the computing device, a retrieval demand for each of the one or more portions;
when the retrieval demand for a first portion of the one or more portions is below a first threshold, indicating, by the computing device, that an existing copy of the first portion will be used for retrieval requests of the first portion within the DSN;
when the retrieval demand for the first portion of the one or more portions is above the first threshold:
copying, by the computing device, the existing copy of the first portion to create a first portion copy;
indicating, by the computing device, that the existing copy of the first portion will be used for retrieval requests from a first group of user computing devices of the DSN; and
indicating, by the computing device, that the first portion copy will be used for retrieval requests from a second group of user computing devices of the DSN.

2. The method of claim 1 further comprises:
dividing the data object into a plurality of data segments, wherein a portion of the plurality of portions includes one or more data segments, and wherein the plurality of data segments is dispersed storage error encoded into pluralities of sets of encoded data slices.

3. The method of claim 1, wherein the determining the retrieval demand comprises one or more of:
an anticipated retrieval demand level;
a historical retrieval demand level based on related content;
indicator from a content provider; and
indicator from a system operator.

4. The method of claim 1 further comprises:
when the retrieval demand for the first portion of the one or more portions is above a second threshold, wherein the second threshold is greater than the first threshold:
copying, by the computing device, the existing copy or the first portion copy to create a second first portion copy; and
indicating, by the computing device, that the second first portion copy will be used for retrieval requests from a third group of user computing devices of the DSN.

5. The method of claim 1 further comprises:
receiving from a first user computing device, a retrieval request for a particular portion of the data object;
determining whether the particular portion has been replicated; and
when the particular portion has been replicated:
determining a set of storage units to retrieve the particular portion from based on the first user computing device affiliation with a group of user computing devices.

6. The method of claim 5 further comprises:
when the particular portion has not been replicated:
identifying a set of storage units within the DSN that is storing the particular portion.

7. The method of claim 5 further comprises:
retrieving one or more sets of encoded data slices from the set of storage units;
decoding the one or more sets of encoded data slices to produce the particular portion; and
sending the particular portion to the first user computing device.

8. A computing device of a dispersed storage network (DSN) comprises:
memory;
an interface; and
a processing module operably coupled to the memory and the interface, wherein the processing module is operable to:
receive, via the interface, a storage request to store one or more portions of a data object, wherein the data object includes a plurality of portions;
determine whether the one or more portions are already stored within a DSN memory;
when the one or more portions are stored:
determine a retrieval demand for each of the one or more portions;
when the retrieval demand for a first portion of the one or more portions is below a first threshold:
indicate that an existing copy of the first portion will be used for retrieval requests of the first portion within the DSN;
when the retrieval demand for the first portion of the one or more portions is above the first threshold:
copy the existing copy of the first portion to create a first portion copy;
indicate that the existing copy of the first portion will be used for retrieval requests from a first group of user computing devices of the DSN; and
indicate that the first portion copy will be used for retrieval requests from a second group of user computing devices of the DSN.

9. The computing device of claim 8, wherein the processing module is further operable to:
divide the data object into a plurality of data segments, wherein a portion of the plurality of portions includes one or more data segments, and wherein the plurality of data segments is dispersed storage error encoded into pluralities of sets of encoded data slices.

10. The computing device of claim 8, wherein the processing module determines the retrieval demand by one or more of:
determining an anticipated retrieval demand level;
determining a historical retrieval demand level based on related content;
receiving, via the interface, an indicator from a content provider; and
receiving, via the interface, an indicator from a system operator.

11. The computing device of claim 8, wherein the processing module is further operable to:
when the retrieval demand for the first portion of the one or more portions is above a second threshold, wherein the second threshold is greater than the first threshold:
copy the existing copy or the first portion copy to create a second first portion copy; and
indicate that the second first portion copy will be used for retrieval requests from a third group of user computing devices of the DSN.

12. The computing device of claim 8, wherein the processing module is further operable to:
receive, via the interface, from a first user computing device, a retrieval request for a particular portion of the data object;
determine whether the particular portion has been replicated; and
when the particular portion has been replicated:
determine a set of storage units to retrieve the particular portion from based on the first user computing device affiliation with a group of user computing devices.

13. The computing device of claim 12, wherein the processing module is further operable to:

when the particular portion has not been replicated:
    identify a set of storage units within the DSN that is storing the particular portion.

14. The computing device of claim 12, wherein the processing module is further operable to:
    retrieve one or more sets of encoded data slices from the set of storage units;
    decode the one or more sets of encoded data slices to produce the particular portion; and
    send, via the interface, the particular portion to the first user computing device.

* * * * *